United States Patent
Frank

(10) Patent No.: US 10,189,153 B2
(45) Date of Patent: Jan. 29, 2019

(54) LEVELING DEVICE ASSEMBLY FOR A HYDRAULIC HAMMER

(71) Applicant: Sonny Frank, Gibbsboro, NJ (US)

(72) Inventor: Sonny Frank, Gibbsboro, NJ (US)

(*) Notice: Subject to any disclaimer, the term of this patent is extended or adjusted under 35 U.S.C. 154(b) by 0 days.

(21) Appl. No.: 15/449,459

(22) Filed: Mar. 3, 2017

(65) Prior Publication Data

US 2017/0274515 A1 Sep. 28, 2017

Related U.S. Application Data

(60) Provisional application No. 62/313,408, filed on Mar. 25, 2016.

(51) Int. Cl.
*B25D 9/14* (2006.01)
*G01C 9/06* (2006.01)
*E02F 3/96* (2006.01)
*E02F 9/26* (2006.01)

(52) U.S. Cl.
CPC .............. *B25D 9/14* (2013.01); *E02F 3/966* (2013.01); *E02F 9/265* (2013.01); *G01C 9/06* (2013.01); *B25D 2250/101* (2013.01); *B25D 2250/221* (2013.01); *G01C 2009/066* (2013.01)

(58) Field of Classification Search
CPC .......... B25F 5/022; B25F 5/023; E02F 3/966; E02F 9/26; E02F 9/264; E02F 9/265; B25D 9/145; B25D 2250/101; B25D 2250/221; B25D 9/12; B25D 9/125; E21B 44/00; G01C 9/06; G01C 2009/066
USPC ............................................. 173/207; 33/334
See application file for complete search history.

(56) References Cited

U.S. PATENT DOCUMENTS

| 3,664,032 | A | 5/1972 | Tompkins |
| 4,329,095 | A | 5/1982 | Schmuck |
| 5,860,481 | A * | 1/1999 | Prokop .................... B25D 9/14 173/17 |
| 6,263,584 | B1 | 7/2001 | Owens |

(Continued)

FOREIGN PATENT DOCUMENTS

| DE | 202013011499 | 7/2014 |
| WO | 0186078 | 11/2001 |
| WO | 2004050308 | 6/2004 |

OTHER PUBLICATIONS

International Search Report dated Jun. 16, 2017, for International Application No. PCT/US2017/020750.

(Continued)

*Primary Examiner* — Stephen F Gerrity
*Assistant Examiner* — Joshua Kotis
(74) *Attorney, Agent, or Firm* — Kim Winston LLP

(57) ABSTRACT

A leveling device assembly for use with a hydraulic hammer is provided. The leveling device assembly comprises a control unit, a leveling sensor in communication with the control unit, and a laser generator in communication with the control unit. Additionally, the laser generator is configured to produce a first colored light beam and a second colored light beam different from the first colored light beam. The control unit is further configured to cause the laser generator to produce the first colored light beam when the leveling sensor indicates the hydraulic hammer is in a substantially vertical position and produce the second colored light beam when the leveling sensor indicates the hydraulic hammer is in a substantially non-vertical position.

20 Claims, 7 Drawing Sheets

(56) References Cited

U.S. PATENT DOCUMENTS

| | | | |
|---|---|---|---|
| 6,522,964 B1 * | 2/2003 | Miki | E02F 9/205 172/315 |
| 6,691,437 B1 | 2/2004 | Yost et al. | |
| 6,755,107 B2 | 6/2004 | Peot et al. | |
| 7,182,148 B1 | 2/2007 | Szieff | |
| 7,540,334 B2 | 6/2009 | Gass et al. | |
| 7,650,699 B2 * | 1/2010 | Yamamoto | B23B 49/00 33/334 |
| 8,424,614 B2 | 4/2013 | Henriksson | |
| 8,511,635 B2 | 8/2013 | Steffen | |
| 8,519,861 B2 * | 8/2013 | Sergyeyenko | B25F 1/02 334/5.32 |
| 8,961,328 B1 | 2/2015 | Schmok | |
| 2002/0133959 A1 * | 9/2002 | Bone | B25F 5/022 33/334 |
| 2005/0251294 A1 * | 11/2005 | Cerwin | B25F 5/022 700/279 |
| 2006/0166753 A1 | 7/2006 | Chan et al. | |
| 2008/0296035 A1 * | 12/2008 | Lohmann | B25D 9/265 173/177 |
| 2009/0198382 A1 * | 8/2009 | Koch | E02F 3/432 700/275 |
| 2009/0320302 A1 | 12/2009 | Boyd | |
| 2012/0250815 A1 * | 10/2012 | Oksman | B25D 9/00 377/16 |
| 2013/0243538 A1 | 9/2013 | Hu et al. | |
| 2014/0000921 A1 * | 1/2014 | Vanko | G01C 9/00 173/11 |
| 2014/0151080 A1 * | 6/2014 | Abe | B25D 17/00 173/90 |
| 2014/0237833 A1 * | 8/2014 | Schubert | G01C 9/06 33/365 |
| 2015/0094953 A1 | 4/2015 | Montgomery | |

OTHER PUBLICATIONS

Written Opinion dated Jun. 16, 2017, for International Application No. PCT/US2017/020750.

* cited by examiner

LEVELING DEVICE ASSEMBLY FOR A HYDRAULIC HAMMER

CROSS-REFERENCE TO RELATED APPLICATIONS

The present application is entitled to and claims the benefit of U.S. Provisional Patent Application No. 62/313,408, filed Mar. 25, 2016, the entire disclosure of which is incorporated by reference herein.

FIELD OF THE INVENTION

The present invention relates generally to leveling devices for use with equipment in the field of construction. In particular, the present invention relates to an improved leveling device assembly for a hydraulic hammer to assist operators in aligning and properly positioning a hydraulic hammer during operation.

BACKGROUND OF THE INVENTION

Hydraulic hammers, e.g., hydraulic breakers, are used in construction for excavating and clearing obstructions such as rocks or stones from the ground. Conventional hydraulic hammers are supposed to be properly aligned prior to impacting e.g., stone or other objects. However, during operation, hydraulic hammers will shift away from the proper alignment and/or desired position and require constant adjustment and realignment by an operator to maintain proper and efficient drilling operation. As such, it becomes increasingly difficult for an operator to maintain the proper alignment of the hydraulic hammer.

Additionally, because the operation and maintenance of hydraulic hammers, and other associated earth moving equipment can be costly, it is desirable to minimize wear-and-tear of such equipment. One way to minimize wear-and-tear is to improve the accuracy and efficiency of such equipment. Therefore, a hydraulic hammer having improved alignment accuracy and precision facilitating safer, more efficient, and less costly operation during use is desirable.

Thus, there is still a need for a method and/or apparatus that can assist a user in addressing the aforementioned problems associated with conventional hydraulic hammers. Such a need is satisfied by a leveling device assembly disclosed herein.

BRIEF SUMMARY OF THE INVENTION

The present invention provides a leveling device assembly for a hydraulic hammer.

In accordance with an exemplary embodiment of the present invention, there is provided a leveling device assembly for a hydraulic hammer comprising a control unit, a leveling sensor in communication with the control unit, and a laser generator in communication with the control unit. The laser generator is configured to produce a first colored light beam and a second colored light beam different than the first colored light beam. The control unit is configured to cause the laser generator to produce the first colored light beam when the leveling sensor indicates the hydraulic hammer is in a substantially vertical position and the second colored light beam when the leveling sensor indicates the hydraulic hammer is in a substantially non-vertical position.

An aspect of the exemplary embodiment is that the leveling device assembly can further comprise a shutoff valve operatively in communication with the control unit for operatively being in communication with a hydraulic system of the hydraulic hammer. The shutoff valve can be configured to move to an open position when the leveling sensor indicates the hydraulic hammer is in a substantially vertical position and move to a closed position when the leveling sensor indicates the hydraulic hammer is in a substantially non-vertical position. Additionally, the shutoff valve can be configured to move to an open position when the laser generator produces the first colored light beam and move to a closed position when the laser generator produces the second colored light beam.

Another aspect of the exemplary embodiment is that the leveling device assembly can further comprise a timer that is operably in communication with the shutoff valve for disengaging the hydraulic system when a set amount of time has passed. The shutoff valve can also be configured to move to a closed position when the timer indicates that the set amount of time has passed. Additionally, the leveling device assembly can further comprise an hour meter. The control unit can be configured to cause the laser generator to produce the first colored light beam when the leveling sensor indicates that the hydraulic hammer is within about 25° from the substantially vertical position. Furthermore, the control unit can be configured to cause the laser generator to produce the second colored light beam when the leveling sensor indicates that the hydraulic hammer is more than about 25° from the substantially vertical position. Finally, the laser generator can be a laser diode for emitting a low-powered laser beam of visible light.

In accordance with an exemplary embodiment of the present invention, there is provided a hydraulic hammer comprising a casing and a leveling device assembly having a housing connectable to the casing. The housing includes a control unit, a leveling sensor in communication with the control unit, a laser generator in communication with the control unit and an opening aligned with the laser generator. The laser generator is configured to produce a first colored light beam and a second colored light beam different from the first colored light beam. The control unit is configured to cause the laser generator to produce the first colored light beam when the leveling sensor indicates the hydraulic hammer is in a substantially vertical position and produce the second colored light beam when the leveling sensor is in a substantially non-vertical position.

An aspect of the exemplary embodiment of the present invention is that the hydraulic hammer further comprises a shutoff valve operatively in communication with the control unit and a hydraulic system of the hydraulic hammer. Furthermore, the shutoff valve can be configured to move to an open position when the leveling sensor indicates that the hydraulic hammer is in a substantially vertical position and move to a closed position when the hydraulic hammer is in a substantially non-vertical position. Additionally, the shutoff valve can be configured to move to an open positon when the laser generator produces the first colored light beam and move to a closed position when the laser generator produces the second colored light beam.

Another aspect of the exemplary embodiment of the present invention is that when the shutoff valve moves to a closed position, the hydraulic hammer automatically shuts off. The hydraulic hammer can further comprise a control panel operatively in communication with the control unit. The hydraulic hammer control panel is configured to selectively prevent the shutoff valve from entering the closed position. Additionally, the hydraulic hammer can further comprise a timer operably in communication with the shutoff valve for disengaging the hydraulic system when a set amount of time has passed. Furthermore, the shutoff valve can be configured to move to a closed position when the timer indicates that the set amount of time has passed. The hydraulic hammer can further comprise an hour meter connectable to the housing.

BRIEF DESCRIPTION OF THE SEVERAL VIEWS OF THE DRAWINGS

The foregoing summary, as well as the following detailed description of the exemplary embodiments of the invention, will be better understood when read in conjunction with the appended drawings. For the purpose of illustrating the invention, there are shown in the drawings exemplary embodiments. It should be understood, however, that the invention is not limited to the precise arrangements and instrumentalities shown.

DETAILED DESCRIPTION OF THE INVENTION

Figure 1:
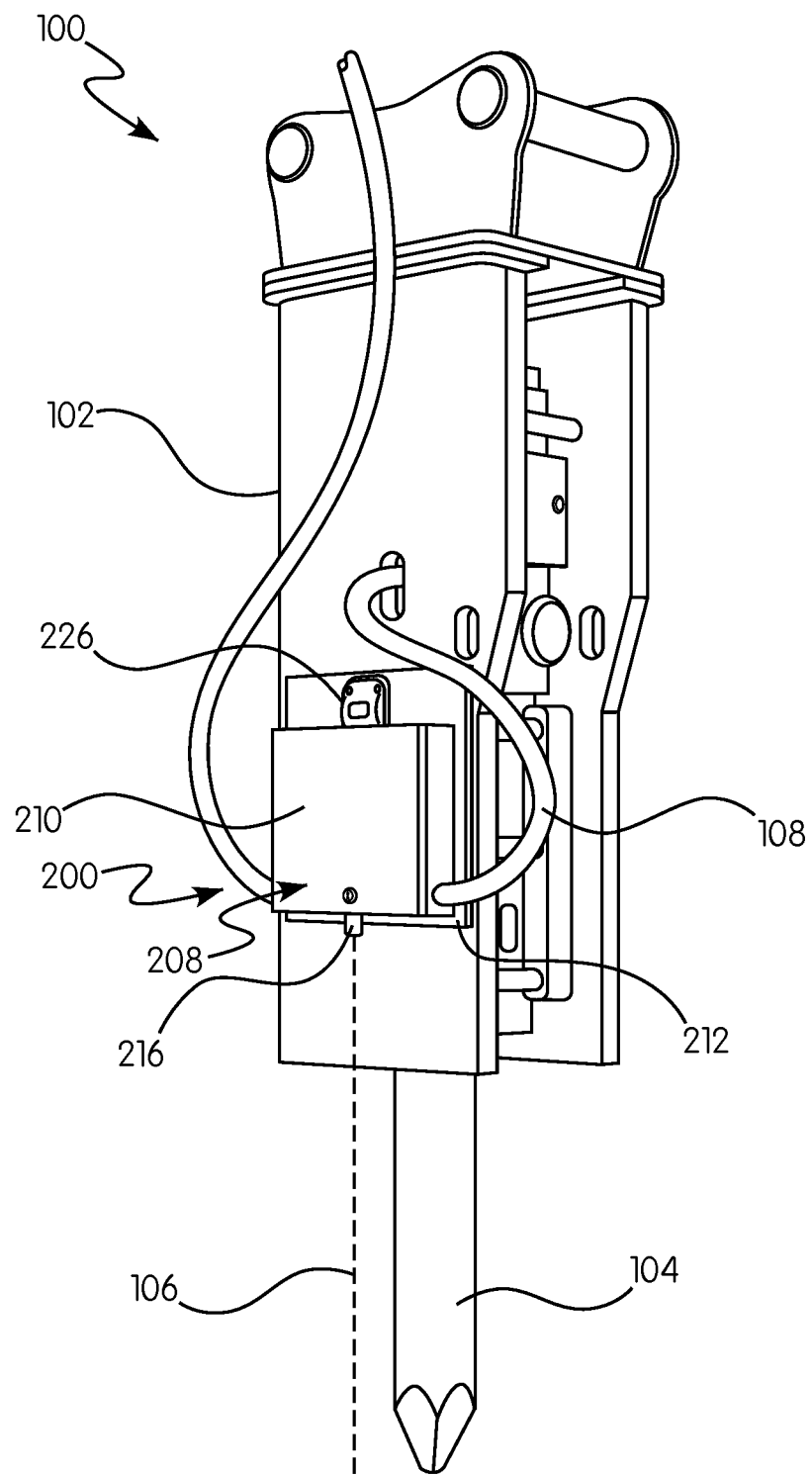
FIG. 1 is a simplified perspective view of a hydraulic hammer having a leveling device assembly in accordance with an exemplary embodiment of the present invention.

Reference will now be made in detail to the various embodiments of the present invention illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limited. Directional terms such as top, bottom, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions towards and away from, respectively, the geometric center of the identified element and designated parts thereof. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the present invention can be presented in a range format. It should be understood that the description in range format is merely for convenience and brevity and should not be construed as an inflexible limitation on the scope of the present invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the present invention may be combined in any suitable manner in one or more embodiments. One skilled in the relevant art will recognize, in light of the description herein, that the present invention can be practiced without one or more of the specific features or advantages of a particular exemplary embodiment. In other instances, additional features and advantages may be recognized in certain embodiments that may not be present in all exemplary embodiments of the present invention.

With reference now to FIGS. 1-7, in accordance with an exemplary embodiment of the present invention, there is provided a leveling device assembly 200 for a hydraulic hammer 100 for facilitating proper positioning and alignment of the hydraulic hammer 100 by an operator.

FIG. 1 illustrates the hydraulic hammer 100 in accordance with an exemplary embodiment of the present invention. The hydraulic hammer 100 includes a casing 102 that covers or houses the internal components of the hydraulic hammer 100 and a drill bit 104 extending from the casing 102. Such hydraulic hammers 100 are known in the art and a detailed description of such hydraulic hammers 100 is not necessary for a complete understanding of the present invention. However, an exemplary hydraulic hammer applicable to the present embodiment is disclosed in, for example, U.S. Pat. No. 8,424,614, the entire disclosure of which is hereby incorporated by reference in its entirety for all purposes.

With reference now to FIG. 1, in an exemplary aspect, the leveling device assembly 200 is attached to an outside surface of the casing 102. In the exemplary embodiment, the leveling device assembly 200 is attached to the casing 102 about a mid-point of a longitudinal length of the casing 102. More preferably, the leveling device assembly 200 is attached about a side of the casing 102 that faces the operator of the hydraulic hammer 100. It is appreciated, however, that the leveling device assembly 200 can be attached to any point along the longitudinal length of the casing 102. Alternatively, the leveling device assembly 200 can be attached to other components of the hydraulic hammer 100 as long the leveling device assembly 200 has a clear line of sight for a laser light beam 106 from the leveling device assembly 200 to emit towards a drilling surface.

Figure 2:
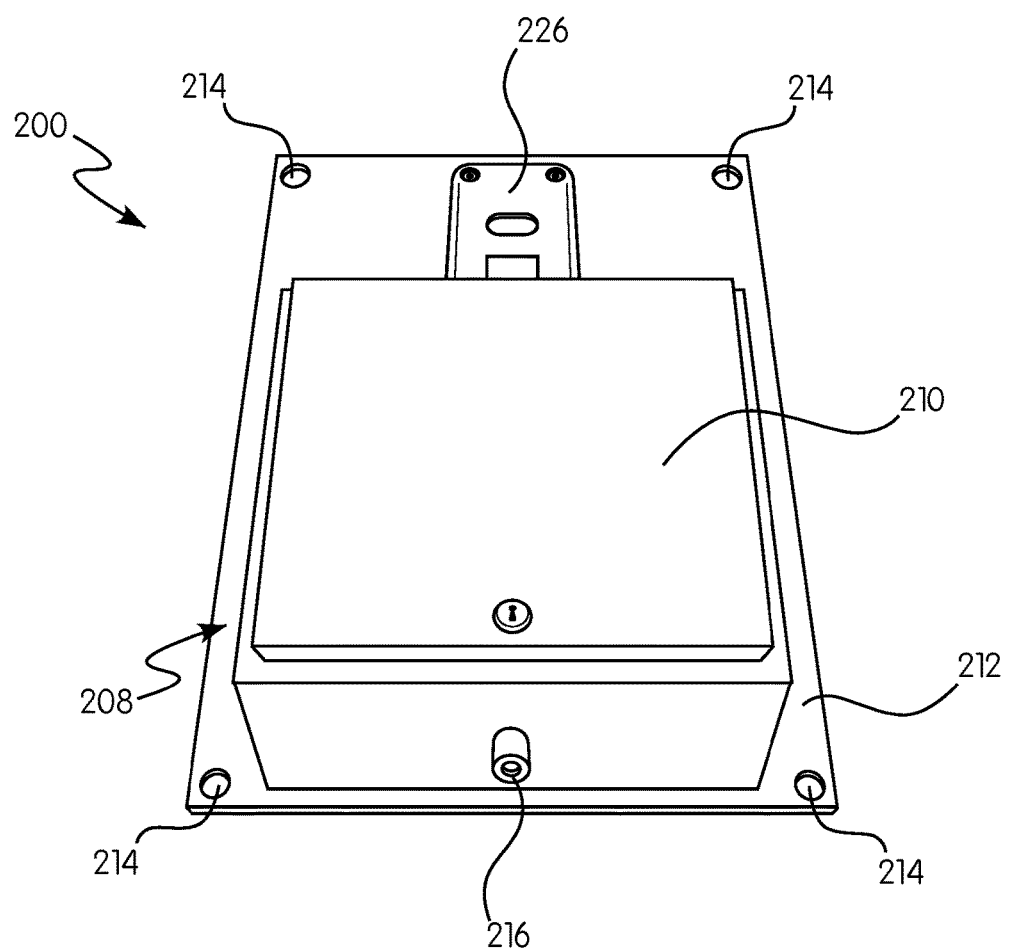
FIG. 2 is a perspective view of the leveling device assembly of FIG. 1.
Figure 3:
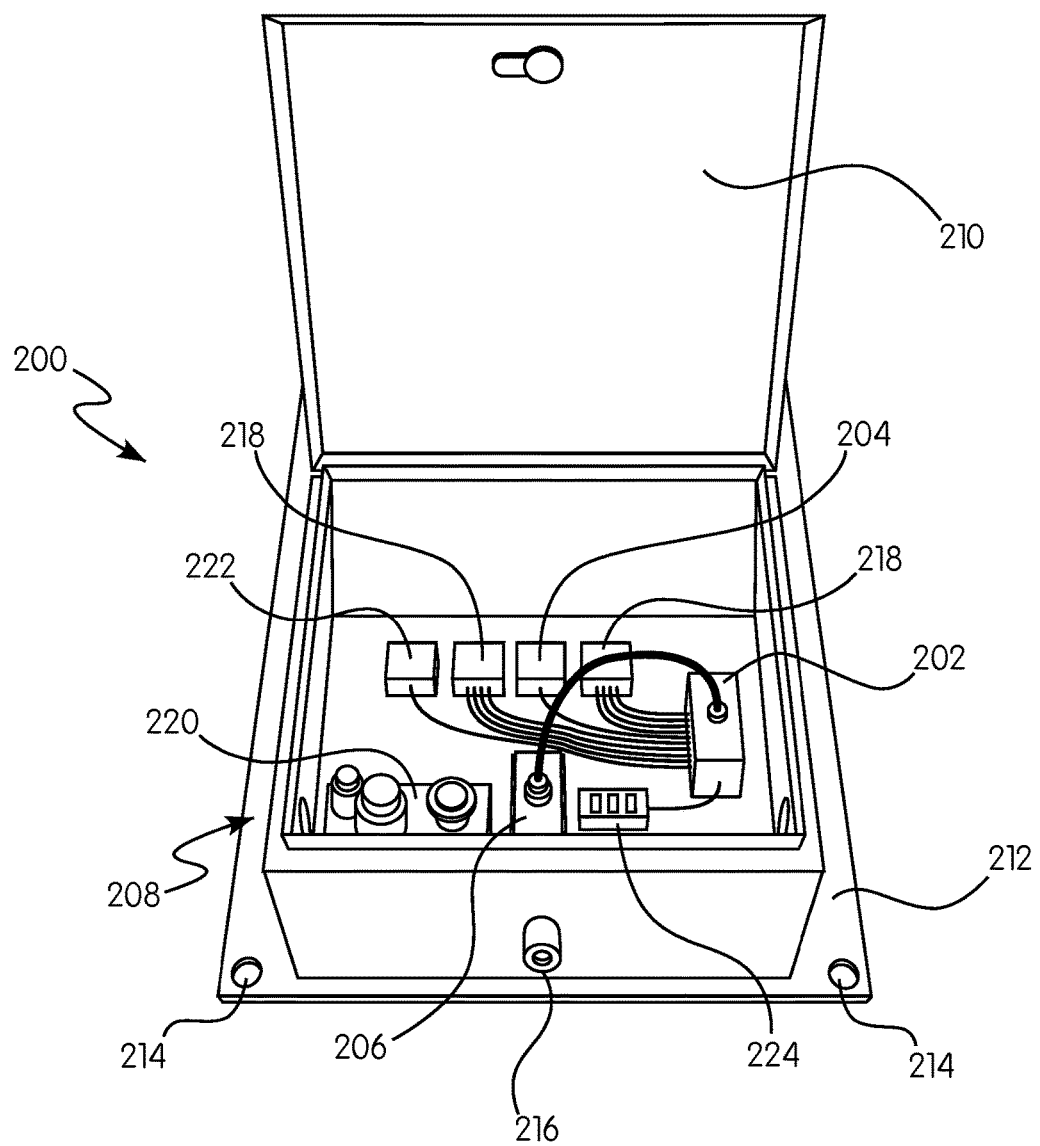
FIG. 3 is a perspective view of the leveling device assembly of FIG. 2 with a cover in an open position.
Figure 4:
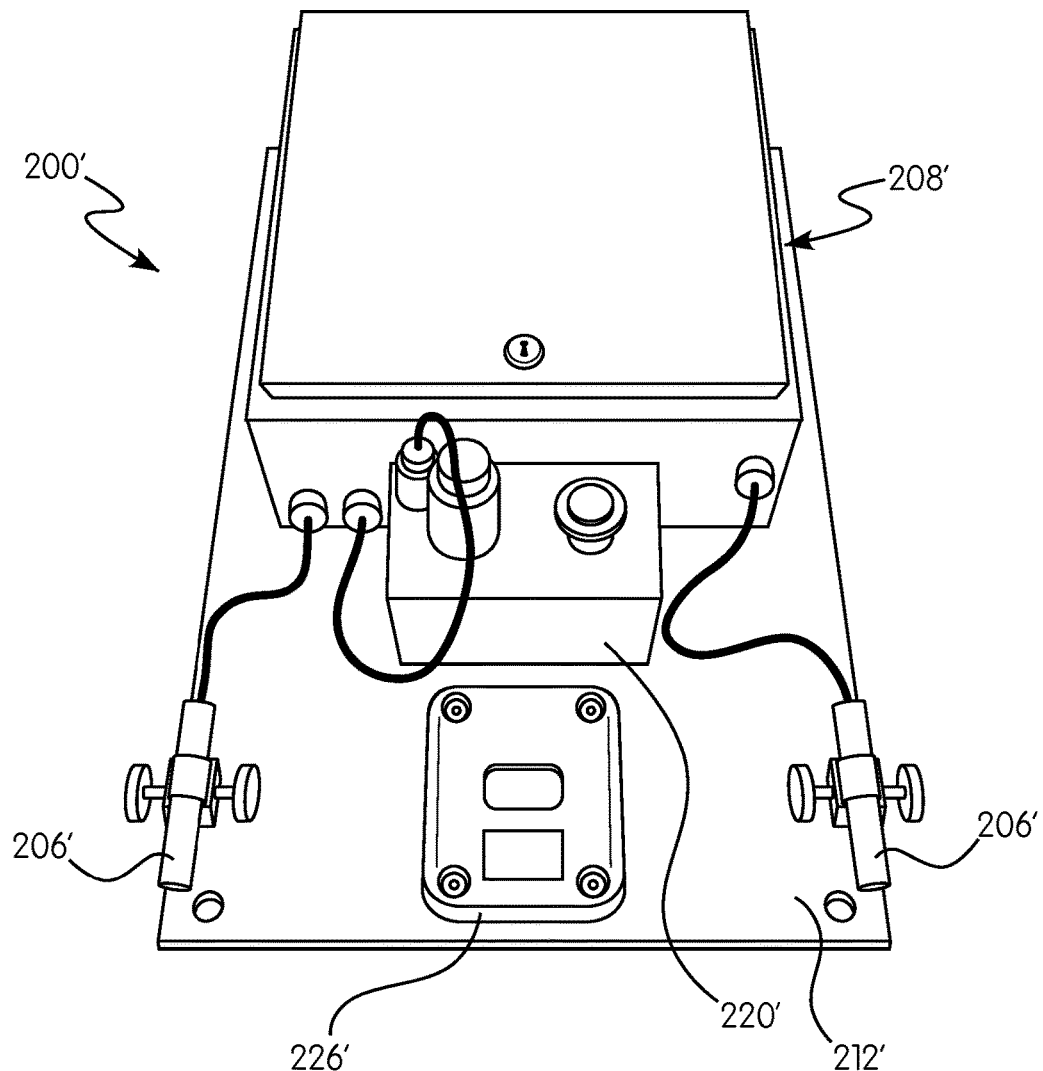
FIG. 4 is a perspective view of a leveling device assembly in accordance with another exemplary embodiment of the present invention.
Figure 5:
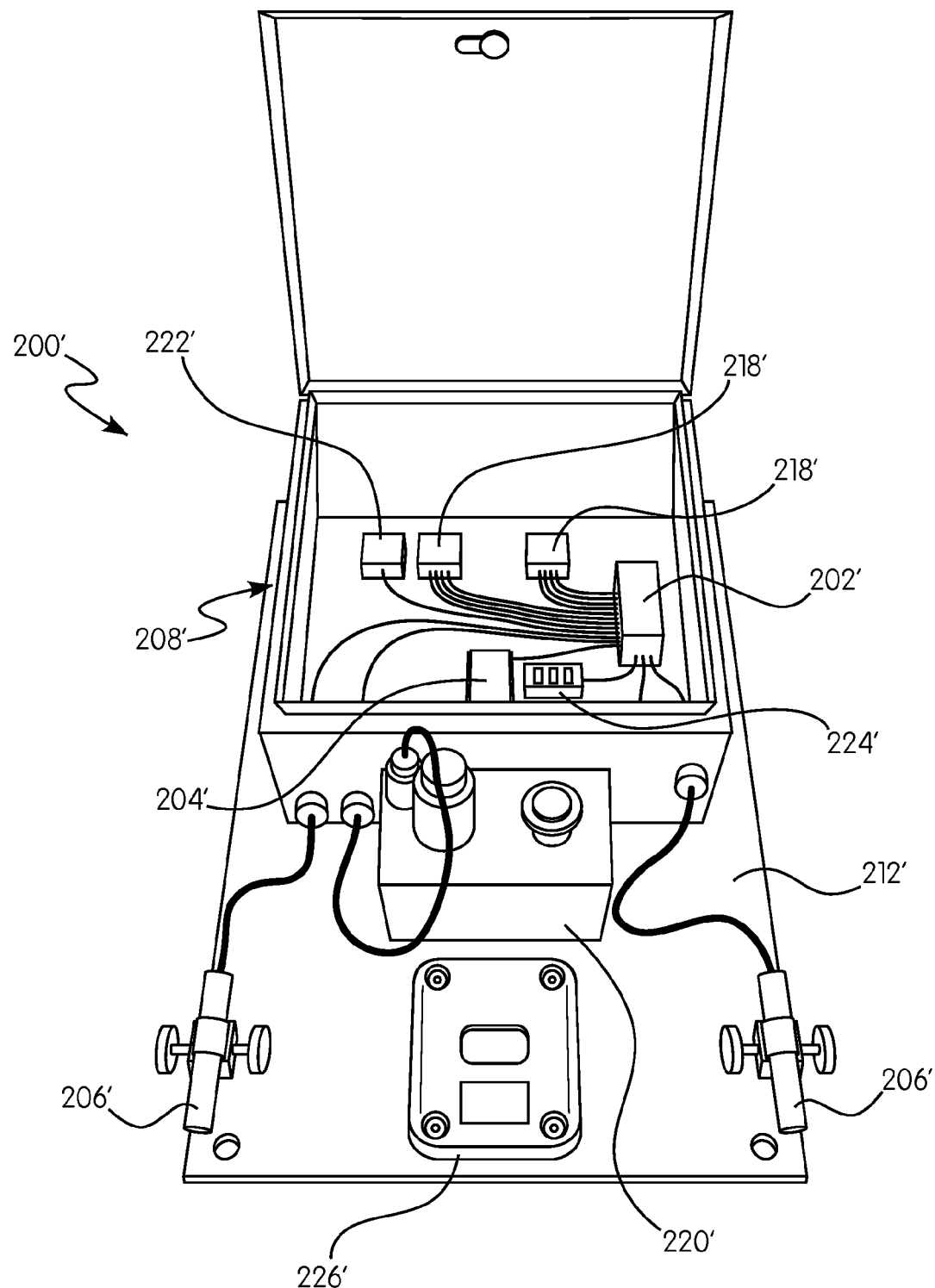
FIG. 5 is a perspective view of the leveling device assembly of FIG. 4 with a cover in an open position.

With reference now to FIGS. 1-3, the leveling device assembly 200 includes a control unit 202, a leveling sensor 204 and a laser generator 206. In the exemplary embodiment, the control unit 202, the leveling sensor 204 and the laser generator 206 are encased within, or built into, a housing 208.

The housing 208 is configured as shown in FIGS. 2 and 3. Specifically, the housing 208 is shaped so as to be easily mountable to the hydraulic hammer's 100 casing 102 and to house the components of the leveling device assembly 200.

In an exemplary embodiment, the housing 208 includes a removable, or openable, cover 210 and a base plate 212. The base plate 212 can be secured to the casing 102 e.g., via fasteners, such as screws extending through apertures 214. Alternatively, the housing 208 can be permanently attached to the casing 102 via welding. In an exemplary embodiment, the housing 208 is constructed out of steel and may also include resilient components so that the housing 208 has sufficient hardness and resilience to withstand forces generated when the hydraulic hammer 100 engages the drilling surface.

The housing 208 serves generally to protect the control unit 202, the leveling sensor 204 and the laser generator 206. Additionally, the housing 208 includes an opening 216 on one side, preferably a bottom facing side, of the housing 208 such that, when mounted to the casing 102, the opening 216 faces a distal end of the hydraulic hammer and, preferably towards a working/drilling surface for drilling, e.g., stone. The opening 216 is sized sufficiently to receive and/or lock the laser generator 206 in place. Alternatively, the opening 216 can be sufficiently large enough such that only the laser light beam 106 generated by the laser generator 206 passes through.

Figure 7:
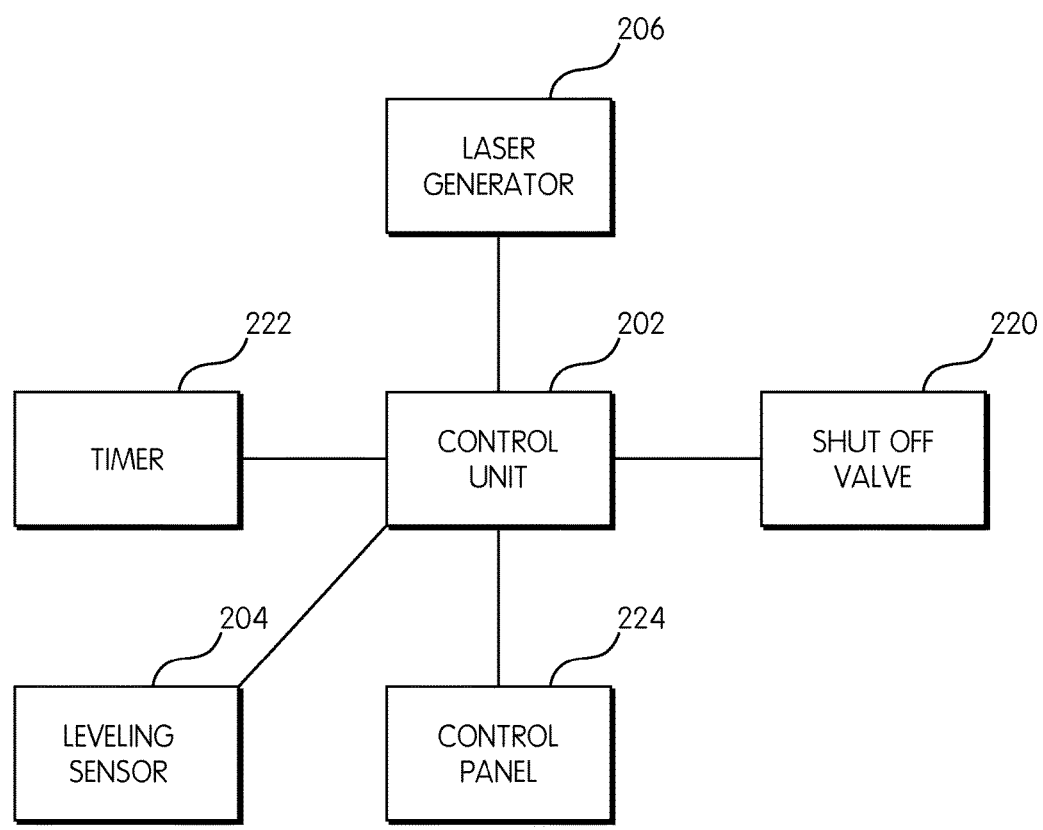
FIG. 7 is a flow diagram interconnecting components applicable to an exemplary embodiment of a leveling device assembly.

As shown in FIGS. 2, 3 and 7, the control unit 202 is operatively connected to power units 218 and various other components of the leveling device assembly 200 for receiving data or signals to cause the leveling device assembly 200 to engage a specific function. Additionally, the control unit 202 can also be connected to a control center (not shown) of the hydraulic hammer 100. In the exemplary embodiment, the control unit 202 is configured to receive positional data from the leveling sensor 204. If the positional data indicates that the hydraulic hammer 100 is not in a substantially vertical position, the control unit 202 is configured to cause the laser generator 206 to produce a second colored light beam and a shutoff valve 220 to automatically shut down the hydraulic hammer 100. Additionally, the control unit 202 can also be configured to communicate with a timer 222 such that when the timer 222 signals that a set amount of time has passed, the shutoff valve 220 automatically shuts down the hydraulic hammer 100. Furthermore, the control unit 202 can also be configured to have its functions be operably controllable via a control panel 224.

Figure 6:
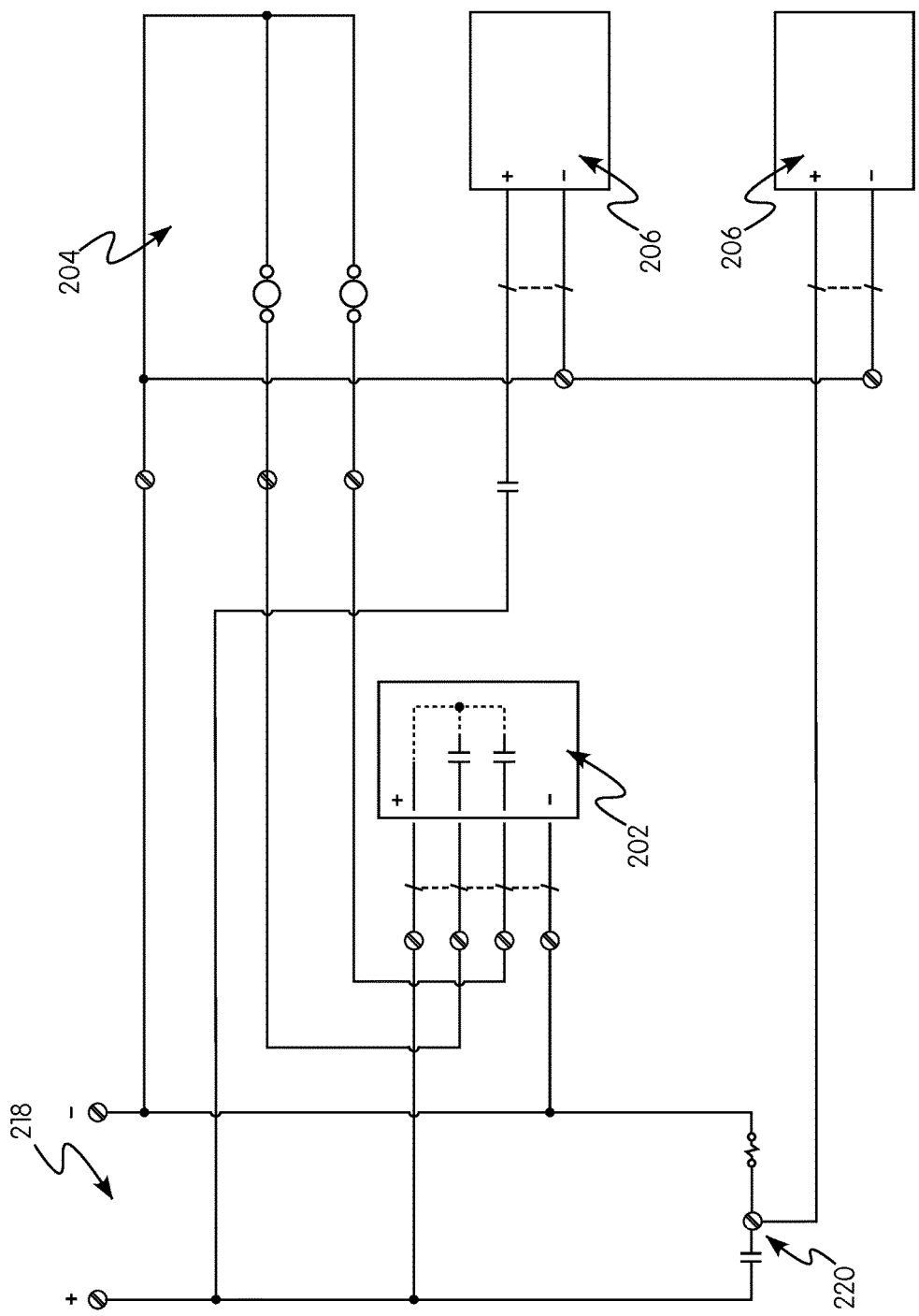
FIG. 6 is a schematic circuit diagram applicable to an exemplary embodiment of a leveling device assembly.

FIG. 6 shows an exemplary circuit diagram applicable to the present invention, depicting the connections between the control unit 202 and the power units 218, leveling sensor 204, laser generator 206 and shutoff valve 220.

With reference again to FIGS. 2 and 3, in an exemplary embodiment, the leveling sensor 204 is a sensor capable of providing positional data and measurements for indicating the orientation of the hydraulic hammer 100. Exemplary leveling sensors applicable to the present embodiment can be e.g., sensors that include fluid or Miro-Electro-Mechanical ("MEM") based tilt or inclination sensors. It is appreciated that the leveling sensor 204 can be other sensors known in the art and utilize other mechanisms such as bubble-levels. Exemplary leveling sensors applicable to the present invention can include e.g., the Model BA 590 Boom Angle Indicator from TWG of Tulsa, Okla. The leveling sensor 204 is configured to indicate whether the hydraulic hammer 100 is in a substantially vertical position or a substantially non-vertical position. The hydraulic hammer 100 is considered to be in a substantially vertical position if it is angled at no more than about 25° from the vertical. It is appreciated, however, that the substantially vertical can be greater or less than 25°, including up to 40° and as little as 0.5°, 5°, 10°, 15°, 20°, and so forth from truly vertical.

In accordance with an exemplary embodiment, the laser generator 206 is a laser diode or other laser light generating mechanism capable of emitting a visible laser or light, such as a low-powered laser beam. In other words, in the exemplary embodiment the laser generator 206 is a laser diode for emitting a low-powered laser beam of visible light. The laser generator 206 is configured to selectively produce at least two different colored laser light beams 106, e.g., a first colored light beam and the second colored light beam. In the exemplary embodiment, the light beams are visible light such that they can be used to highlight the target drilling area for an operator and visibly indicate the status of the hydraulic hammer 100 via a color code. The laser generator 206 is arranged in the housing 208 such that, when engaged, the laser light beam 106 is emitted through the opening 216 of the housing 208 either by projecting through the opening 216 or being aligned with the opening 216.

The laser generator 206 is configured to produce the first colored light beam when the hydraulic hammer 100 is in the substantially vertical position and the second colored light beam when the hydraulic hammer 100 is in the substantially non-vertical position. In an aspect of the exemplary invention, the laser light beam 106 can be a red light to represent a non-vertical position or a green light to represent a substantially vertical position. However, it is appreciated that any color light can be used, such as yellow, orange, purple, blue, and so forth.

The leveling device assembly 200 can optionally include the shutoff valve 220, the timer 222, an hour meter 226 and the control panel 224. The shutoff valve 220, the timer 222, the hour meter 226 and the control panel 224 can be positioned inside the housing 208, secured to the housing's 208 base plate 212, and/or secured to other components of the hydraulic hammer 100, such as the casing 102.

The shutoff valve 220 is a valve, such as a disc valve, in communication with the hydraulic hammer's 100 hydraulic line and selectively limits the flow of hydraulic fluid to the hydraulic hammer 100 to effectuate a shutdown of the hydraulic hammer. In other words, as shown in FIGS. 1 and 3, the shutoff valve 220 is operably connected to a hydraulic hose 108 of a hydraulic system of the hydraulic hammer 100. Preferably, the shutoff valve 220 is positioned inside the housing 208.

The shutoff valve 220 is operatively connected to and in communication with the control unit 202 and/or control panel 224. In an exemplary aspect, the shutoff valve 220 is configured to automatically move to a closed position under a variety of conditions. For example, the shutoff valve 220 may enter the closed position when the laser generator 206 generates the second colored light beam, when the leveling sensor 204 indicates that the hydraulic hammer 100 is not in a substantially vertical position, or when the timer 222 indicates a set amount of time has passed.

In other words, the leveling device assembly 200 comprises a shutoff valve 220 operably in communication with the control unit 202 for operatively being in communication with a hydraulic system of the hydraulic hammer 100. That is, the hydraulic hammer 100 comprises a shutoff valve operatively in communication with the control unit 202 and a hydraulic system of the hydraulic hammer 100. Further, the shutoff valve 220 is configured to move to an open position when the leveling sensor 204 indicates the hydraulic hammer 100 is in a substantially vertical position and move to a closed position when the leveling sensor 204 indicates the hydraulic hammer 100 is in a substantially non-vertical position. Additionally, the shutoff valve 220 is configured to move to an open position when the laser generator 206 produces the first colored light beam and move to a closed position when the laser generator 206 produces the second colored light beam. Consequently, when the shutoff valve 220 moves to a closed position, the hydraulic hammer 100 is shut down.

The timer 222 is a time tracking component or feature, such as a clock or software built into, e.g., the control unit 202 or housing 208 that is configured to track how long the hydraulic hammer 100 has been in a drilling state. Specifically, the timer 222 is configured to communicate with the control unit 202 such that, when a set amount of time passes, i.e. a threshold time, the timer sends a signal to the control unit 202 to cause the shutoff valve 220 to move to the closed position. Additionally, the timer 222 is adjustable such that the threshold time can be modified. The threshold time can be as little as 10 seconds and as long as 10 minutes but can alternatively be more than 10 minutes, e.g. 20 minutes, 30 minutes, 60 minutes, 120 minutes and so forth. The timer 222 can be secured to the base plate 212 or otherwise positioned within the housing 208.

In other words, the leveling device 10 comprises a timer 222 operably in communication with the shutoff valve 220 for disengaging the hydraulic system when a set amount of time has passed. That is, the hydraulic hammer 100 further comprises a timer 222 operably in communication with the shutoff valve 220 for disengaging the hydraulic system when a set amount of time has passed. The shutoff valve 220 is configured to move to a closed position when the timer 222 indicates that the set amount of time has passed.

The hour meter 226 is configured to track the amount of hours the hydraulic hammer 100 has operated, and more specifically how long the hydraulic hammer 100 has engaged the drilling surface. The hour meter 226 includes an operational threshold defined as the required g (g-force) the hour meter 226 must experience before the hour meter 226 will begin to track hours. The hour meter 226 experiences g-force when the hydraulic hammer 100 enters the drilling state and contacts the drilling surface. In the exemplary embodiment, the operational threshold is about 2 g, however it is appreciated that the operational threshold can be anywhere from 1 to 5 g or more than 5 g. Additionally, the hour meter 226 is configured to be attached to the housing 208, such as to the base plate 212, the casing 102 or otherwise positioned within the housing 208.

In sum, the leveling device assembly 200 comprises an hour meter 226 connectable to the leveling device assembly 200. The hydraulic hammer 100 comprises an hour meter 226 connectable to the housing 208.

It is appreciated by those skilled in the art that the timer 222 and hour meter 226 do not have to be separate components. Instead, the timer 222 and hour meter 226 can be combined into one component or feature.

The control panel 224 is configured to allow an operator of the hydraulic hammer 100 to control the various components of the leveling device assembly 200. Preferably, the control panel 224 is positioned inside the housing 208 and is accessible via the removable lid or cover 210 of the housing 208. Alternatively, the control panel 224 can be configured to secure to the casing 102 of the hydraulic hammer 100 or the base plate 212 of the housing 208. The control panel 224 can include an "ON/OFF" switch for the timer 222, the shutoff valve 220, the laser generator 206 and the leveling sensor 204. Additionally, the control panel 224 can also include a general override switch to override any automatic functions of the leveling device assembly 200, such as the shutoff valve 220 entering a closed position under the conditions described above. The control panel 224 can also function to set the operational parameters of the leveling device assembly 200, such as the timer's 222 threshold time and the control unit's 202 angle defining the substantially vertical orientation. In other words, the hydraulic hammer 100 further comprises a control panel 224 operatively in communication with the control unit 202, wherein the control panel 224 is configure to prevent the shutoff valve 220 from entering the closed position.

Referring now to FIGS. 1-3, the fully assembled laser device assembly 200 in accordance with an exemplary embodiment is shown. Specifically, the leveling device assembly's housing 208 is secured to the casing 102 and positioned such that the laser generator 206 faces downward towards, e.g., the ground, i.e. the drilling surface. Additionally, the leveling device assembly 200 is mounted to the casing 102 such that the laser generated by the laser generator 206 is parallel with a longitudinal length of the hydraulic hammer 100 or the drill bit 104 of the hydraulic hammer 100.

Interconnected within the housing 208 are the control unit 202, the leveling sensor 204 and the laser generator 206. The leveling sensor 204 and the laser generator 206 are both in communication with the control unit 202. The housing 208 also includes, either inside or secured to its base plate 212, the hour meter 226 and the timer 222 in communication with the control unit 202. Finally, the shutoff valve 220, preferably from inside the housing 208, is operatively connected to the hydraulic hose 108 of the hydraulic hammer 100.

The present invention operates by utilizing the leveling device assembly 200 to monitor how level the hydraulic hammer 100 is with respect to the vertical and to give a visual cue when the hydraulic hammer 100 is no longer within an acceptable range of vertical positioning. If the hydraulic hammer 100 is not level, i.e., in a substantially non-vertical orientation, the leveling device assembly 200 functions to automatically shut off of the hydraulic hammer 100 so that the hydraulic hammer 100 must be realigned or repositioned before the hydraulic hammer 100 can be restarted.

To accomplish the leveling and visual functions of the leveling device assembly 200, the leveling sensor 204 provides continuous positional data to the control unit 202. The control unit 202 takes positional data and determines whether the hydraulic hammer 100 is substantially vertical. If the hydraulic hammer 100 is substantially vertical, the hydraulic hammer 100 continues to operate as normal and the laser generator 206 emits a first colored light. If the hydraulic hammer 100 is not substantially vertical, i.e. substantially non-vertical, the control unit 202 causes the laser generator 206 to emit the second colored light and the shutoff valve 220 to enter the closed position. When the shutoff valve 220 enters the closed position, the flow of hydraulic fluid through the hydraulic hose 108 is stopped which, consequently, stops the hydraulic hammer 100.

In other words, the control unit 202 is configured to cause the laser generator 206 to produce the first colored light beam when the leveling sensor 204 indicates the hydraulic hammer 100 is within about 25° of the substantially vertical position. Additionally, the control unit 202 is configured to cause the laser generator 206 to produce the second colored light beam when the leveling sensor 204 indicates the hydraulic hammer 100 is more than about 25° from the substantially vertical position.

Additionally, if the timer 222 is included, the timer 222 communicates to the control unit 202 how long the hydraulic hammer 100 has been operating. When the timer 222 indicates that the threshold time has passed, such as 30 seconds, the control unit 202 causes the shutoff valve 220 to enter the closed position. The timer 222 can be adjusted, via, e.g., the control panel 224, to specify what the threshold time will be, e.g. 1 minute, 2 minutes, etc. Furthermore, if the hour meter 226 is included, the hour meter 226 tracks the how long the hydraulic hammer 100 has been operating and engaging the drilling surface. Finally, the control panel 224 can be used by the operator of the hydraulic hammer 100 to modify and control the above features including turning ON/OFF the automatic shutoff feature of the shutoff valve 220 and the laser generator 206, and altering the values of the threshold time and the acceptable angle range for the substantially vertical orientation.

It is appreciated that the hydraulic hammer 100 can include alternate embodiments of the leveling device assembly 200. Specifically, with reference now to FIGS. 4 and 5, the hydraulic hammer 100 can include a leveling device assembly 200' having a housing 208', a control unit 202', a leveling sensor 204', a laser generator 206', a shutoff valve 220', a timer 222', an hour meter 226' and a control panel 224'. The leveling device assembly 200' is configured substantially as shown. Additionally, it is appreciated that the teachings above with respect to the leveling device assembly 200 are equally applicable to the leveling device assembly 200' except as described below.

The housing 208' does not include an opening configured to receive the laser generator 206' or its laser light beam 106. Instead, the laser generator 206' is affixed to outside of the housing 208' to a base plate 212'. Additionally, the leveling device assembly 200' can include a second laser generator 206', wherein one of the laser generators 206' is configured to produce a first colored light beam and the other laser generator 206' is configured to produce a second colored light beam. Furthermore, the control unit 202' is configured to selectively engage one of the two laser generators 206' depending on the vertical alignment of the hydraulic hammer 100 as described above. Furthermore, the shutoff valve 220' can be positioned on the base plate 212', instead of inside the housing 208'.

The advantages of the present invention are apparent. For example, the leveling device assembly provides a visual cue, i.e. the colored light beams, to an operator of the hydraulic hammer. The operator can thus quickly react to realign the hydraulic hammer if necessary. When properly aligned, the hydraulic hammer operates more efficiently on the drilling surface. Furthermore, the recommended time frame for continuously using a hydraulic hammer is 30 seconds; anything greater than 30 seconds increases the wear-and-tear on the hydraulic hammer. The inclusion of a timer in conjunction with a shut-off valve helps minimize wear-and-tear.

While the present invention has been described with reference to exemplary embodiments, it will be appreciated by those skilled in the art that various changes may be made and equivalents may be substituted for elements thereof without departing from the scope of the present invention. For example, the leveling device assembly can be either an independent component configured to attach to a hydraulic hammer or may be built into the hydraulic hammer. In addition, modifications may be made to adapt a particular situation or material to the teachings of the present invention without departing from the essential scope thereof. For example, the shutoff valve can be incorporated into a valve of the hydraulic hammer, rather than be configured to attach to the hydraulic hoses of the hydraulic hammer. It is to be understood, therefore, that the present invention not be limited to the particular aspects or exemplary embodiments disclosed, but it is intended to cover modifications within the spirit and scope of the present invention as defined by the appended claims.

I claim:

1. A leveling device assembly for a hydraulic hammer comprising:
 a control unit;
 a leveling sensor in communication with the control unit;
 a laser generator in communication with the control unit and configured to produce a first colored light beam and a second colored light beam different from the first colored light beam; and
 a shutoff valve in communication with the control unit for operatively being in communication with a hydraulic system of the hydraulic hammer;
 wherein the control unit causes the laser generator to produce the first colored light beam when the leveling sensor indicates the hydraulic hammer is in a substantially vertical position and produce the second colored light beam when the leveling sensor indicates the hydraulic hammer is in a substantially non-vertical position, and
 wherein the control unit causes the shutoff valve to move to an open position when the leveling sensor indicates the hydraulic hammer is in the substantially vertical position and move to a closed position when the leveling sensor indicates the hydraulic hammer is in the substantially non-vertical position.

2. The leveling device assembly of claim 1, further comprising a timer operably in communication with the shutoff valve for disengaging the hydraulic system when a set amount of time has passed.

3. The leveling device assembly of claim 2, wherein the shutoff valve is configured to move to the closed position when the timer indicates that the set amount of time has passed.

4. The leveling device assembly of claim 1, further comprising an hour meter.

5. The leveling device assembly of claim 1, wherein the control unit is configured to cause the laser generator to produce the first colored light beam when the leveling sensor indicates the hydraulic hammer is within 25° of the substantially vertical position.

6. The leveling device assembly of claim 1, wherein the control unit is configured to cause the laser generator to produce the second colored light beam when the leveling sensor indicates the hydraulic hammer is more than 25° from the substantially vertical position.

7. The leveling device assembly of claim 1, wherein the laser generator is a laser diode for emitting a low-powered laser beam of visible light.

8. A hydraulic hammer comprising:
 a casing; and
 a leveling device assembly connected to the casing and including:
 a control unit,
 a leveling sensor in communication with the control unit,
 a laser generator in communication with the control unit and configured to produce a first colored light beam and a second colored light beam different from the first colored light beam, and
 a shutoff valve in communication with the control unit and a hydraulic system of the hydraulic hammer,
 wherein the control unit is configured to cause the laser generator to produce the first colored light beam when the leveling sensor indicates the hydraulic hammer is in a substantially vertical position and produce the second colored light beam when the leveling sensor indicates the hydraulic hammer is in a substantially non-vertical position, and wherein the control unit causes the shutoff valve to move to an open position when the leveling sensor indicates the hydraulic hammer is in the substantially vertical position and move to a closed position when the leveling sensor indicates the hydraulic hammer is in the substantially non-vertical position.

9. The hydraulic hammer of claim 8, wherein when the shutoff valve moves to the closed position, the hydraulic hammer automatically shuts off.

10. The hydraulic hammer of claim 8, further comprising a control panel operatively in communication with the control unit, wherein the control panel is configured to selectively prevent the shutoff valve from entering the closed position.

11. The hydraulic hammer of claim 8, further comprising a timer operably in communication with the shutoff valve for disengaging the hydraulic system when a set amount of time has passed.

12. The hydraulic hammer of claim 11, wherein the shutoff valve is configured to move to the closed position when the timer indicates that the set amount of time has passed.

13. The hydraulic hammer of claim 8, further comprising an hour meter connectable to the leveling device assembly.

14. The hydraulic hammer of claim 8, wherein the leveling device assembly includes a housing having an opening aligned with the laser generator.

15. A leveling device assembly for a hydraulic hammer comprising:
a control unit;
a leveling sensor in communication with the control unit;
a laser generator in communication with the control unit and configured to produce a first colored light beam and a second colored light beam different from the first colored light beam; and
a shutoff valve in communication with the control unit for operatively being in communication with a hydraulic system of the hydraulic hammer;
wherein the control unit causes the laser generator to produce the first colored light beam when the leveling sensor indicates the hydraulic hammer is in a substantially vertical position and produce the second colored light beam when the leveling sensor indicates the hydraulic hammer is in a substantially non-vertical position, and
wherein the control unit causes the shutoff valve to move to an open position when the laser generator produces the first colored light beam and move to a closed position when the laser generator produces the second colored light beam.

16. The leveling device assembly for a hydraulic hammer of claim 15, further comprising:
a timer operably in communication with the shutoff valve for disengaging the hydraulic system when a set amount of time has passed; or
an hour meter.

17. The leveling device assembly for a hydraulic hammer of claim 15,
wherein the shutoff valve is configured to move to the closed position when a timer operably in communication with the shutoff valve for disengaging the hydraulic system indicates that a set amount of time has passed, or wherein the control unit is configured to cause the laser generator to produce the first colored light beam when the leveling sensor indicates the hydraulic hammer is within 25° of the substantially vertical position, or wherein the control unit is configured to cause the laser generator to produce the second colored light beam when the leveling sensor indicates the hydraulic hammer is more than 25° from the substantially vertical position, or wherein the laser generator is a laser diode for emitting a low-powered laser beam of visible light.

18. A hydraulic hammer comprising:
a casing; and
a leveling device assembly connected to the casing and including:
a control unit,
a leveling sensor in communication with the control unit,
a laser generator in communication with the control unit and configured to produce a first colored light beam and a second colored light beam different from the first colored light beam, and
a shutoff valve in communication with the control unit for operatively being in communication with a hydraulic system of the hydraulic hammer,
wherein the control unit is configured to cause the laser generator to produce the first colored light beam when the leveling sensor indicates the hydraulic hammer is in a substantially vertical position and produce the second colored light beam when the leveling sensor indicates the hydraulic hammer is in a substantially non-vertical position, and
wherein the control unit causes the shutoff valve to move to an open position when the laser generator produces the first colored light beam and move to a closed position when the laser generator produces the second colored light beam.

19. The hydraulic hammer of claim 18, further comprising:
a control panel operatively in communication with the control unit, wherein the control panel is configured to selectively prevent the shutoff valve from entering the closed position; or
a timer operably in communication with the shutoff valve for disengaging the hydraulic system when a set amount of time has passed; or
an hour meter connectable to the leveling device assembly.

20. The hydraulic hammer of claim 18,
wherein when the shutoff valve moves to the closed position, the hydraulic hammer automatically shuts off, or
wherein the shutoff valve is configured to move to the closed position when a timer operably in communication with the shutoff valve for disengaging the hydraulic system indicates that a set amount of time has passed, or
wherein the leveling device assembly includes a housing having an opening aligned with the laser generator.

* * * * *